United States Patent
Sato et al.

(10) Patent No.: US 9,664,576 B2
(45) Date of Patent: May 30, 2017

(54) LOAD DETECTOR AND ELECTRONIC UNIT USING THE SAME

(71) Applicant: ALPS ELECTRIC CO., LTD., Tokyo (JP)

(72) Inventors: Takashi Sato, Niigata-ken (JP); Eiji Umetsu, Niigata-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 93 days.

(21) Appl. No.: 14/610,445

(22) Filed: Jan. 30, 2015

(65) Prior Publication Data

US 2015/0241287 A1 Aug. 27, 2015

(30) Foreign Application Priority Data

Feb. 26, 2014 (JP) ................................. 2014-035547

(51) Int. Cl.
| | | |
|---|---|---|
| G01L 1/10 | (2006.01) | |
| G01L 1/04 | (2006.01) | |
| G01L 1/18 | (2006.01) | |
| G01L 1/22 | (2006.01) | |

(52) U.S. Cl.
CPC .................. *G01L 1/04* (2013.01); *G01L 1/18* (2013.01); *G01L 1/2225* (2013.01)

(58) Field of Classification Search
CPC ............ G01L 1/04; G01L 1/2225; G01L 1/18
USPC ...... 73/862.625, 862.627, 862.628, 862.629; 200/294, 406
See application file for complete search history.

(56) References Cited

U.S. PATENT DOCUMENTS

| | | | | |
|---|---|---|---|---|
| 2005/0126901 A1* | 6/2005 | Takeuchi et al. .... | H01H 13/785 | 200/406 |
| 2005/0224330 A1* | 10/2005 | Liu et al. ............... | H01H 13/48 | 200/345 |
| 2007/0264743 A1* | 11/2007 | Vaganov et al. ...... | G06F 3/0338 | 438/51 |
| 2010/0011883 A1* | 1/2010 | Werber et al. ............ | G01L 1/26 | 73/862.391 |
| 2010/0011885 A1* | 1/2010 | Ohsato et al. ............ | G01L 1/26 | 73/862.627 |
| 2013/0104669 A1* | 5/2013 | Umetsu et al. ....... | G06F 3/0338 | 73/862.041 |

FOREIGN PATENT DOCUMENTS

| | | |
|---|---|---|
| JP | 2013-20604 A | 1/2013 |
| JP | 2013-217679 A | 10/2013 |

* cited by examiner

*Primary Examiner* — Lisa Caputo
*Assistant Examiner* — Roger Hernandez-Prewitt
(74) *Attorney, Agent, or Firm* — Brinks Gilson & Lione

(57) ABSTRACT

A load detector and an electronic unit using load detectors include a load sensor having a projective pressure receiving part, a case in which the load sensor is placed with the pressure receiving part facing toward the upper surface of the case, and an elastic body placed on the same side as the upper surface of the load sensor, the elastic body configured to receive a load and press the load sensor in its height direction.

10 Claims, 10 Drawing Sheets

LOAD DETECTOR AND ELECTRONIC UNIT USING THE SAME

CLAIM OF PRIORITY

This application contains subject matter related to and claims the benefit of priority to Japanese Patent Application No. 2014-035547 filed on Feb. 26, 2014, the entire contents of which is incorporated herein by reference in its entirety.

BACKGROUND

1. Field of the Disclosure

The present disclosure relates to a load detector, and more particularly to a load detector in which a load sensor is placed in a case.

2. Description of the Related Art

International Publication No. WO2010/113698 disloses and information input apparatus having a pressure detecting unit is disclosed in. The information input apparatus disclosed in International Publication No. WO2010/113698 is structured so that an initial load is applied to a pressure detecting unit by a load applying member.

Japanese Unexamined Patent Application Publication No. 2004-279080 discloses a load detector (in Japanese Unexamined Patent Application Publication No. 2004-279080, the load detector is referred to as the load sensor). FIG. 13 is a cross-sectional view of a load detector 110 described in Japanese Unexamined Patent Application Publication No. 2004-279080 as a conventional example. As illustrated in FIG. 13, the load detector 110 in the conventional example includes a diaphragm 104, a driving body 102 placed on the upper surface of the diaphragm 104, and a manipulating body 101 placed above the upper surface of the driving body 102 with elastic bodies 103 intervening between them. The diaphragm 104, driving body 102, elastic bodies 103, and manipulating body 101, which constitute the load detector 110, are built into a case 105.

When the manipulating body 101 is pressed, the driving body 102 is pressed through the elastic bodies 103 and the diaphragm 104 is displaced in its height direction accordingly.

The load detector disclosed in International Publication No. WO2010/113698 is problematic in that since the load sensor in an exposed state is built into an electronic unit, the load detector cannot be easily handled.

With the load detector 110 described in Japanese Unexamined Patent Application Publication No. 2004-279080 as a conventional example, the diaphragm 104 is placed in the case 105, the diaphragm 104 corresponding to a sensor is not directly touched.

In the load detector 110 in the conventional example, however, the driving body 102, elastic bodies 103, and manipulating body 101 are placed on the same side as the upper surface of the diaphragm 104 as members by which a load is transferred to the diaphragm 104. Therefore, the load detector 110 in the conventional example includes many parts, making it difficult to reduce the size and profile of the load detector 110.

As illustrated in FIG. 13, the load detector 110 in the conventional example includes a stopper mechanism in which the lower surface 101a of the manipulating body 101 abuts the peripheral part of the diaphragm 104. The stopper mechanism is structured so that the manipulating body 101 comes into direct contact with the diaphragm 104 to stop the displacement of the manipulating body 101. When the stopper mechanism functions, therefore, an excessive load is applied to the diaphragm 104. This is problematic in that, for example, the diaphragm 104 may be damaged or sensor sensitivity may be lowered.

SUMMARY

The load detector in the present disclosure includes a load sensor having a projective pressure receiving part, a case in which the load sensor is placed with the pressure receiving part facing toward the upper surface of the case, and an elastic body placed on the same side as the upper surface of the load sensor, the elastic body being configured to receive a load and press the load sensor in its height direction.

Since the load sensor is placed in the case, the load sensor is not directly touched during the handling of the load detector, so the ease of handling of the load detector is superior. Since a load is transferred from the elastic body, which is placed on the same side as the upper surface of the load sensor, to the load sensor, there is no need to provide the manipulating body and other members, which have been placed on the elastic bodies in the conventional load detector. This reduces the number of parts and can thereby implement a compact load detector. In addition, since the elastic body directly or indirectly abuts the pressure receiving part on the upper surface of the load sensor, even if a strong impact is applied, the impact is absorbed by the elastic body. This prevents an excessive load from being applied to the load sensor. Therefore, superior and stable sensor sensitivity can be obtained.

As described above, the load detector in the present disclosure can achieve superior ease of handling, can be made small, and can provide superior sensor sensitivity.

DETAILED DESCRIPTION OF THE DISCLOSURE

Specific embodiments of a load detector and an electronic unit will be described with reference to the drawings. The dimensions on the drawings have been appropriately changed.

First Embodiment

Figure 1:
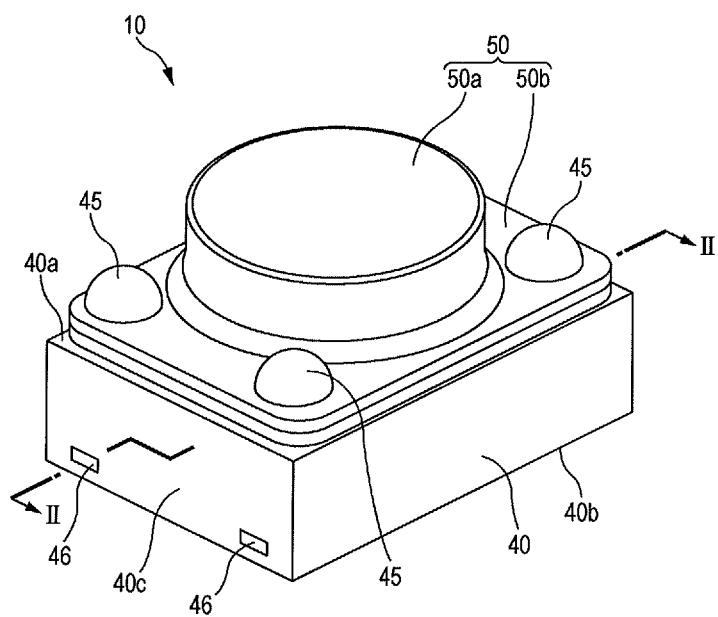
FIG. 1 is a perspective view of a load detector according to a first embodiment of the present disclosure.
Figure 2:
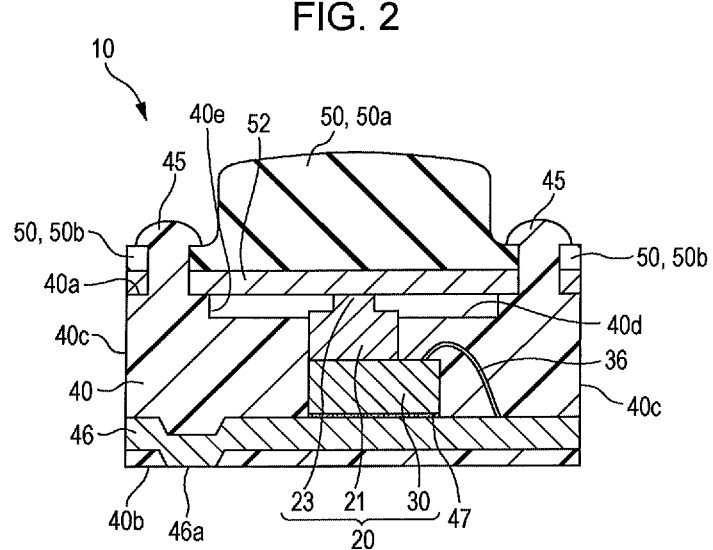
FIG. 2 is a cross-sectional view of the load detector along line II-II in FIG. 1 when viewed in the direction indicated by the arrows.

FIG. 1 is a perspective view of a load detector according to a first embodiment. FIG. 2 is a cross-sectional view of the load detector along line II-II in FIG. 1 when viewed in the direction indicated by the arrows.

As illustrated in FIGS. 1 and 2, the load detector 10 in this embodiment includes a load sensor 20, a case 40, and an elastic body 50. As illustrated in FIG. 1, the case 40, the outer shape of which is a substantially rectangular parallelepiped, has an upper surface 40a, a lower surface 40b, and side surfaces 40c, which mutually link the upper surface 40a and lower surface 40b. As illustrated in FIG. 2, the load sensor 20 has a pressure receiving part 23, which is projective, and is placed in the case 40 with the pressure receiving part 23 facing toward the upper surface 40a. The elastic body 50 is placed on the same side as the upper surface of the load sensor 20. When the elastic body 50 receives a load, the elastic body 50 presses the load sensor 20 in its height direction.

As illustrated in FIG. 2, a lead frame 46 may be provided so as to extend from the interior of the case 40 toward the outside of the case 40. The load sensor 20 may be electrically connected to the lead frame 46 through a bonding wire 36.

Figure 3:
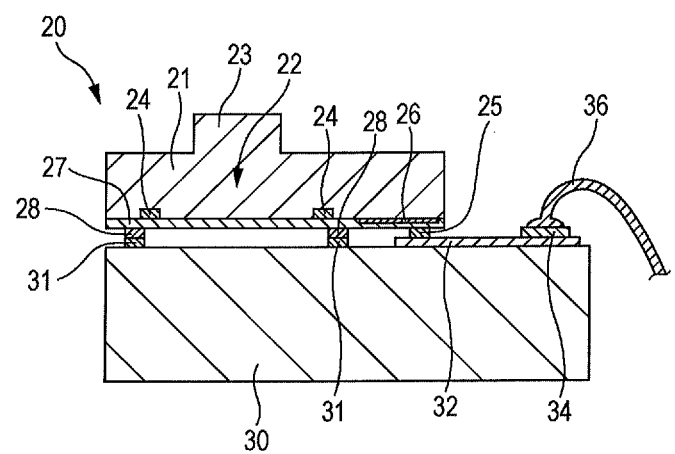
FIG. 3 is a cross-sectional view of a load sensor included in the load detector in the first embodiment.
Figure 4:
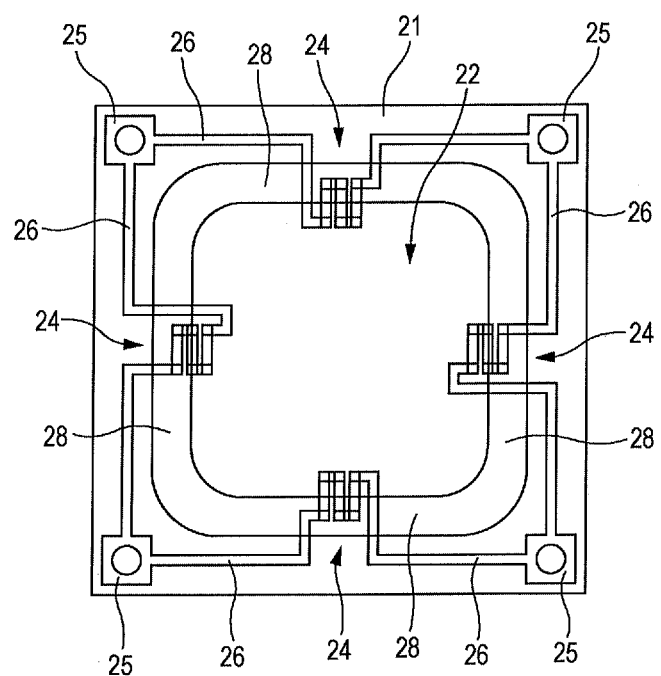
FIG. 4 is a plan view of a sensor substrate included in the load sensor.

FIG. 3 is a cross-sectional view of the load sensor included in the load detector in this embodiment. FIG. 4 is a plan view of a sensor substrate included in the load sensor. The structure of the load sensor 20 will be described below with reference to FIGS. 3 and 4.

As illustrated in FIG. 3, the load sensor 20 includes a base substrate 30 and a sensor substrate 21, which are each formed with, for example, a silicon substrate. The sensor substrate 21 has a displacement part 22 and a pressure receiving part 23, which upwardly projects from the displacement part 22. The displacement part 22 is displaceable in its height direction. When the pressure receiving part 23 receives a pressing force, the displacement part 22 is displaced downwardly.

As illustrated in FIG. 4, a plurality of piezoresistive elements 24, a plurality of electrically connecting parts 25, and a plurality of circuit wires 26, each of which mutually connects one piezoresistive element 24 and one electrically connecting parts 25, are formed on the same side as the lower surface of the sensor substrate 21. As illustrated in FIG. 4, the plurality of piezoresistive elements 24 are disposed along the periphery of the displacement part 22, each two adjacent piezoresistive elements 24 being formed with a 90° phase shift. The plurality of piezoresistive elements 24 are mutually connected through the circuit wires 26, forming a bridge circuit. When the pressure receiving part 23 receives a pressing force, the displacement part 22 is displaced and the resistance of each piezoresistive element 24 is changed according to the displacement. Then, the midpoint potential of the bride circuit is changed, so an output from the load sensor 20 is obtained.

As illustrated in FIG. 3, each piezoresistive element 24 and each circuit wire 26 are covered with an insulating layer 27. Also as illustrated in FIG. 3 and FIG. 4, sensor-side bonding layers 28 for bonding to the base substrate 30 are formed on the lower surface-side of the sensor substrate 21. Each sensor-side bonding layer 28 preferably has a closed form that encloses the displacement part 22. Also as illustrated in FIG. 3, base-side bonding layers 31 are formed on the base substrate 30 so as to face the sensor-side bonding layers 28. The sensor-side bonding layer 28 and its corresponding base-side bonding layer 31 are mutually bonded. The sensor substrate 21 and base substrate 30 are mutually bonded with a space between them in which the displacement part 22 is displaceable.

Also as illustrated in FIG. 3, the electrically connecting part 25 is connected to an electrically wiring part 32 provided on the base substrate 30, and the bonding wire 36 is connected to an electrode pad 34 formed on the electrically wiring part 32. The bonding wire 36 is connected to the lead frame 46 (in FIG. 3, not illustrated), and an output from the load sensor 20 is output to the outside through the bonding wire 36.

As illustrated in FIG. 2, the load sensor 20 is placed in the case 40 with the pressure receiving part 23 facing toward the upper surface 40a. The elastic body 50 is placed on the same side as the upper surface of the load sensor 20. The elastic body 50 may have a thick part 50a formed at a position at which the thick part 50a faces the load sensor 20 in its height direction and may also have a peripheral part 50b formed around the thick part 50a, the peripheral part 50b being thinner than the thick part 50a. The thick part 50a may project beyond the peripheral part 50b. An external load is applied to the thick part 50a. The lower surface of the elastic body 50 is formed so as to be flat. The elastic body 50 is secured to the upper surface 40a of the case 40 through a plate 52, which is more rigid than the elastic body 50.

When the load detector 10 in this embodiment is built into an electronic unit or the like, the plate 52 abuts the pressure receiving part 23 and an initial load is applied to the built-in load detector 10. When an external load is applied to the thick part 50a of the elastic body 50, the elastic body 50 is deformed in its height direction, during which the elastic body 50 presses the pressure receiving part 23 in its height direction, transferring the load to the pressure receiving part 23.

The elastic body 50 may be made of a rubber material that can be elastically deformed in its height direction. However, the material of the elastic body 50 is not limited to a rubber material; any material that is elastic can be used. For example, a spring can be used. Since the pressure receiving part 23 is pressed through the plate 52, the load applied to the elastic body 50 can be efficiently transferred to the pressure receiving part 23. The elastic body 50 and plate 52 may be molded into a single member. The elastic body 50 may be brought into direct contact with the pressure receiving part 23 without providing the plate 52.

Since, in the load detector 10 in this embodiment, the load sensor 20 is placed in the case 40, the load sensor 20 is not directly touched during the handling of the load detector 10, so the ease of handling of the load detector 10 is superior. Since a load is transferred from the elastic body 50, which is placed on the same side as the upper surface of the load sensor 20, to the load sensor 20, there is no need to provide the manipulating body 101 or another member, which have been placed on the elastic bodies 103 in the load detector 110 in the conventional example in FIG. 13. This reduces the number of parts and can thereby reduce the size of the load detector 10. In addition, since the elastic body 50 directly or indirectly abuts the pressure receiving part 23 of the load sensor 20, even if a strong impact is applied, the impact is absorbed by the elastic body 50. This prevents an excessive load from being applied to the load sensor 20. Therefore, superior and stable sensor sensitivity can be obtained.

Also as illustrated in FIG. 2, an external load is transferred to the load sensor 20 through the thick part 50a with the peripheral part 50b of the elastic body 50 secured to the case 40. Therefore, an amount by which the thick part 50a is deformed due to an applied load can be controlled by changing the elastic modulus and thickness of the thick part 50a. This enables an appropriate stroke range to be set when a load is applied to the load detector 10. Therefore, superior and stable sensor sensitivity can be obtained.

Also as illustrated in FIG. 2, in this embodiment, the load sensor 20 may be bonded to the upper surface of the lead frame 46 with an adhesive 47 and is electrically connected to the lead frame 46 through the bonding wire 36. Although, in FIG. 2, only one lead frame 46 is indicated, a plurality of lead frames 46 are provided as illustrated in FIG. 1 and the load sensor 20 is electrically connected to the plurality of lead frames 46. As illustrated in FIG. 2, the lead frame 46 is embedded into the case 40 so as to extend from the interior of the case 40 toward the outside and. Ends of the lead frame 46 are exposed to the relevant side surfaces 40c of the case 40. Part of the lead frame 46 is curved and another part of the lead frame 46 is exposed to the lower surface 40b of the case 40.

According to this embodiment, an output signal from the load sensor 20 can be output to the outside through the lead frames 46. When the load detector 10 is connected to an external substrate (not illustrated), if the lead frames 46 exposed to the lower surface 40b are used as mounting electrodes 46a, the load detector 10 can be surface-mounted. Therefore, the load detector 10 can be easily connected to the external substrate and the ease of handling of the load detector 10 can thereby be improved when compared with a method in which a flexible substrate and bonding wires are used for a connection to an external substrate.

Since the load sensor 20 is bonded onto the lead frames 46, the size and profile of the load detector 10 can be reduced when compared with a case in which the load sensor 20 is attached to a place other than the lead frames 46.

In this embodiment, a resin material may be used as the material of the case 40. Polyphenylenesulfide (PPS), polybutylene terephthalate (PBT), polycarbonate (PC), and other thermoplastic resins, for example, can be used.

When a thermoplastic resin is used as the material of the case 40, the case 40 can be molded integrally together with the lead frames 46 and load sensor 20. Specifically, in the manufacturing process of the load detector 10 in this embodiment, the load sensor 20 is first bonded to the lead frames 46 and is electrically connected to the lead frames 46 with the bonding wires 36. The load sensor 20 and lead frames 46, which are mutually connected, are placed in a metal mold, after which a melted resin is poured into the metal mold, integrating the lead frames 46, load sensor 20, and case 40 together.

Thus, as illustrated in FIG. 2, the case 40 in which at least the pressure receiving part 23 is exposed and the periphery of the load sensor 20 is filled with the resin can be formed. In the case 40, an intermediate plane 40d is formed below the upper surface 40a and a space is left between the intermediate plane 40d and the elastic body 50 (plate 52). The pressure receiving part 23 of the load sensor 20 projects from the intermediate plane 40d and abuts the plate 52.

Since the case 40 is resin-molded integrally with the lead frames 46 and load sensor 20, there is no need to leave an unnecessary space around the load sensor 20 unlike a case in which the case 40 is formed separately and the load sensor 20 is bonded and connected in the case 40. Then, the size and profile of the load detector 10 can be reliably reduced. Since the periphery of the load sensor 20 is sealed with the resin, when the load detector 10 is handled, it is possible to reliably prevent the load sensor 20 from being touched and improve ease of handling. Since the periphery of the load sensor 20 is secured by being filled with the resin, it is possible to reliably detect a load applied to the pressure receiving part 23 and obtain superior sensor sensitivity.

Figure 12A:
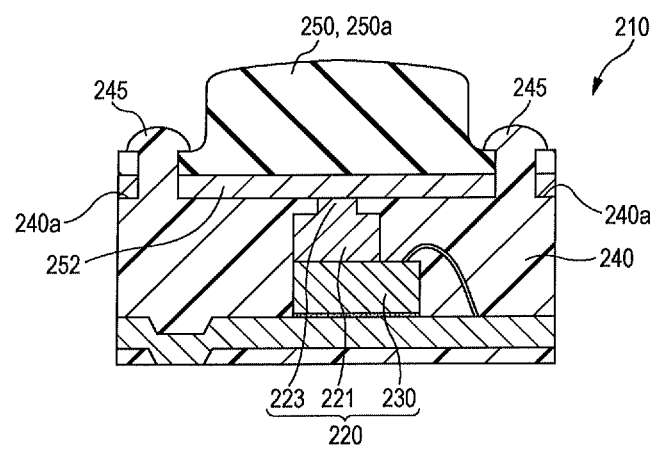
FIG. 12A is a cross-sectional view of a load detector in a first comparative example.
Figure 12B:
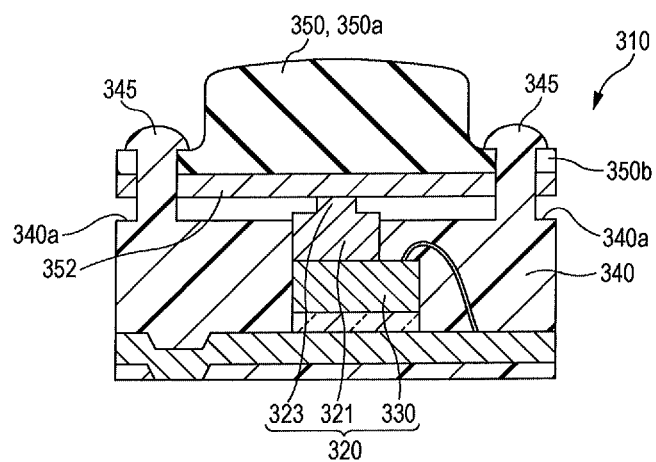
FIG. 12B is a cross-sectional view of a load detector in a second comparative example.

FIG. 12A is a cross-sectional view of the load detector in a first comparative example, and FIG. 12B is a cross-sectional view of the load detector in a second comparative example. In the load detector 210 in the first comparative example in FIG. 12A, the upper surface 240a of a case 240 is formed so as to be flat, and the periphery of a pressure receiving part 223 is sealed with a resin. As illustrated in FIG. 12A, the upper surface of the pressure receiving part 223 and the upper surface 240a of the case 240 are formed so as to be flush with each other. In this case, when a load is applied to an elastic body 250, the movable range of the pressure receiving part 223 is restricted by the peripheral resin. When the pressure receiving part 223 is displaced, it receives a resistance by the peripheral resin, so sensor sensitivity for a load is lowered. Although FIG. 12A illustrates an example in which only the top surface of the pressure receiving part 223 is exposed, the above problem, is not limited to this arrangement. When the resin is in contact with the pressure receiving part 223, a similar problem occurs.

In the load detector 310 in the second comparative example in FIG. 12B, the upper surface 340a of a case 340 is formed so as to be flat, and the height of the load sensor is increased with a spacer formed with a glass plate or the like to expose a pressure receiving part 323 from the upper surface 340a. In this case, since the pressure receiving part 323 projects beyond the upper surface 340a, the height of the load detector 310 is increased. Another problem is that when an elastic body 350 receives a load, not only a thick part 350a but also a peripheral part 350b become displaceable, so it is hard to reliably transfer a load applied to the elastic body 350 to the pressure receiving part 323, lowering sensor sensitivity.

In the load detector 10 in this embodiment, however, a concave part 40e may be formed in the upper surface 40a of the case 40 as illustrated in FIG. 2. The pressure receiving part 23 of the load sensor 20 may project from the bottom surface (intermediate plane 40d) of the concave part 40e and may be exposed from the case 40. Accordingly, since the periphery of the pressure receiving part 23 is not sealed with a resin, when a load is applied, the pressure receiving part 23 becomes displaceable without restriction by the resin, so superior sensor sensitivity is obtained. The upper surface of the sensor substrate 21 is also exposed from the upper surface 40a of the case 40 without being sealed with the resin, so the displacement of the displacement part 22 (in FIG. 2, not illustrated) on the sensor substrate 21 is not restricted by the resin and a load can thereby be superiorly detected according to the displacement of the pressure receiving part 23. Since the concave part 40e is formed to expose the pressure receiving part 23, the profile of the load detector 10 can be reduced.

As illustrated in FIGS. 1 and 2, convex parts 45 may be formed on the upper surface 40a of the case 40. In the peripheral part 50b of the elastic body 50 and the plate 52, through-holes may be formed at places corresponding to the convex parts 45. Each convex part 45 may be formed so as to pass through the peripheral part 50b and plate 52. The upper end of the convex part 45 is deformed so as to have a larger diameter than the through-hole and is press-fitted by, for example, a thermal caulking method, securing the elastic body 50 and plate 52 to the case 40.

Figure 5A:
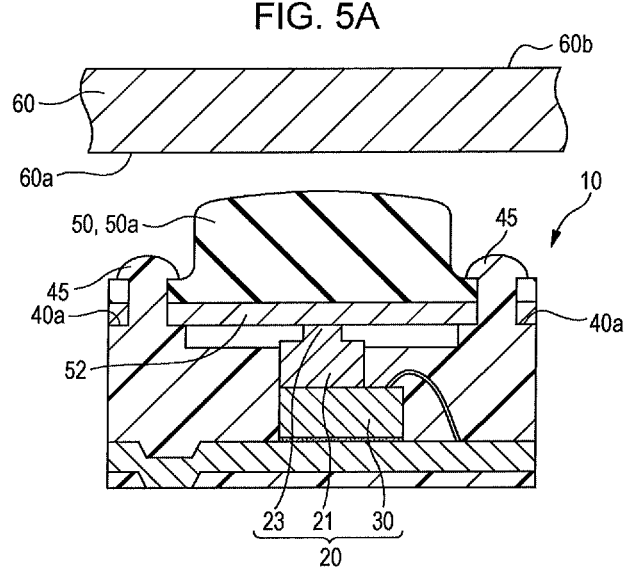
FIG. 5A is a cross-sectional view in a state in which the load detector in the first embodiment is built into an electronic unit.
Figure 5B:
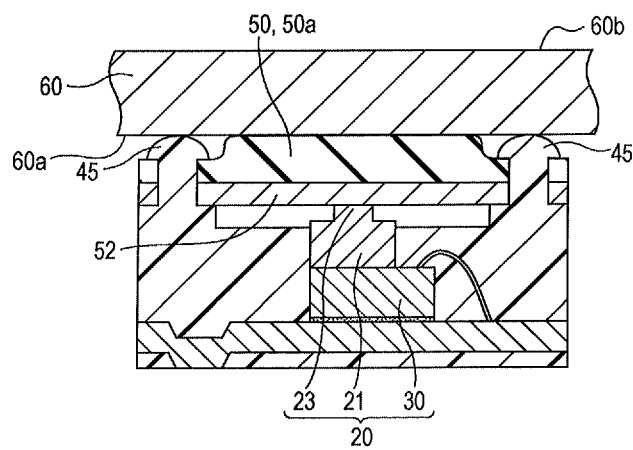
FIG. 5B is a cross-sectional view of the electronic unit in a state in which a surface panel is pressed.

FIG. 5A is a cross-sectional view in a state in which the load detector in this embodiment is built into an electronic unit, and FIG. 5B is a cross-sectional view of the electronic unit in a state in which a surface panel is pressed. As illustrated in FIG. 5A, when the load detector 10 is built into the electronic unit, a surface panel 60 is placed so as to face the elastic body 50. The upper surface of the elastic body 50 may be formed so as to project beyond the convex parts 45.

As illustrated in FIG. 5B, when the manipulator presses the manipulation surface 60b of the surface panel 60 to apply a downward load to the surface panel 60, the surface panel 60 is downwardly deformed and the elastic body 50 is pressed by the lower surface 60a of the surface panel 60 and is deformed, transferring the load to the load sensor 20. Even if an excessive load is applied, the lower surface 60a of the surface panel 60 abuts the convex parts 45 as illustrated in FIG. 5B, preventing the further downward displacement of the surface panel 60.

Therefore, even if an excessive load is applied when the load detector 10 in this embodiment is built into an electronic unit, each convex part 45 may function as a stopper that restricts the amount of deformation of the elastic body 50, so the amount of deformation of the elastic body 50 is restricted. Thus, it is possible to restrict a pressing force to be applied to the load sensor 20 and prevent the load sensor 20 from being damaged.

Figure 13:
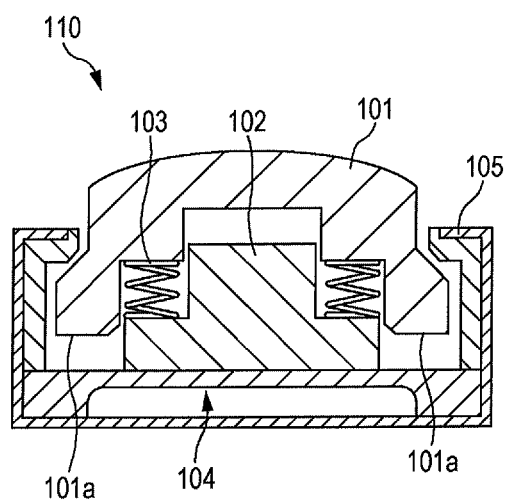
FIG. 13 is a cross-sectional view of a load detector in a conventional example.

Unlike the structure of the load detector 110 in the conventional example illustrated in FIG. 13, in which a member abuts the load sensor itself to restrict the displacement of the surface panel 60 and the like, the surface panel 60 and the like abut the convex parts 45 formed on the upper surface 40a of the case 40. Therefore, unlike the conventional example, an excessive load is not applied to the load sensor 20, so it is possible to suppress the load sensor 20 from being damaged and maintain superior sensor sensibility.

Since, in this embodiment, the convex part 45 has a function of a securing member that secures the elastic body 50 and a function of a stopper that restricts the displacement of the surface panel 60 and the like disposed outside, the size of the load detector 10 can be reduced when compared with a structure in which a securing member and a stopper are provided separately.

As described above, the load detector 10 in this embodiment can achieve superior ease of handling, can be made small, and can provide superior sensor sensitivity.

Figure 6:
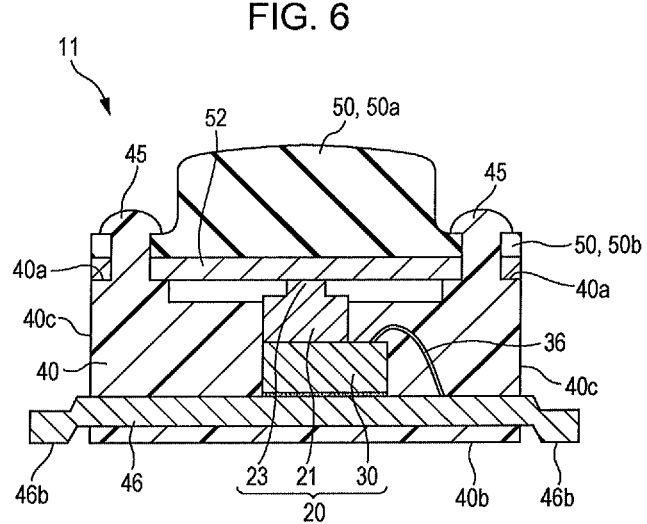
FIG. 6 is a cross-sectional view of a load detector in a first variation of the first embodiment.

FIG. 6 is a cross-sectional view of a load detector in a first variation of this embodiment. The load detector 11 in this variation differs in that each lead frame 46 extends from the relevant side surfaces 40c of the case 40. The lead frame 46 extending from the side surfaces 40c of the case 40 is downwardly bent so that the lower surface of the lead frame 46 is substantially flush with the lower surface 40b of the case 40. When the load detector 11 is mounted on an external substrate (not illustrated), the lower surface of the lead frame 46 is used as a mounting electrode 46b to surface-mount the load detector 11. The shape of the lead frame 46 is not limited to the form illustrated in FIG. 6; the shape can be appropriately changed.

Figure 7:
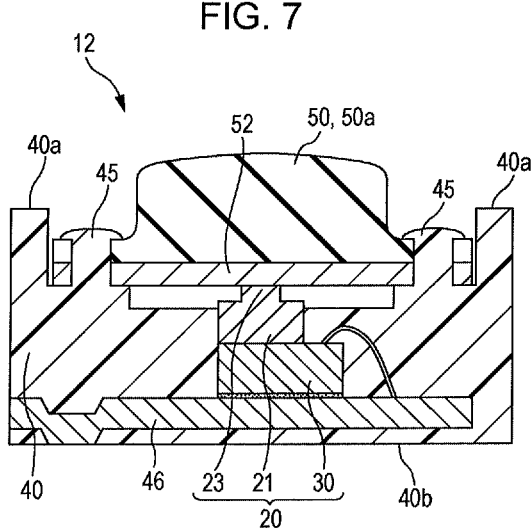
FIG. 7 is a cross-sectional view of a load detector in a second variation of the first embodiment.

FIG. 7 is a cross-sectional view of a load detector in a second variation of this embodiment. The load detector 12 in this variation differs in that the upper surface 40a of the case 40 is higher than the top of each convex part 45. When a load is applied to the surface panel 60 (in FIG. 7, not illustrated) while the load detector 12 is built into an external electronic unit, the surface panel 60 abuts the upper surface 40a of the case 40, restricting the further downward displacement of the surface panel 60. Accordingly, the upper surface 40a of the case 40 functions as a stopper and the convex part 45 is used as a securing member that secures the elastic body 50 and plate 52 together.

The load detector 12 in this variation is disadvantageous in size reduction when compared with the load detector 10 illustrated in FIGS. 1 to 5B. However, the upper surface 40a, which functions as a stopper, is not used as a securing member, so it is not subject to machining and deforming such as thermal caulking, enabling the upper surface 40a to be machined to a precise height dimension. Therefore, even if an excessive load is applied, it is possible to reliably restrict the amount of deformation of the elastic body 50 and prevent the load sensor 20 from being damaged.

Figure 8:
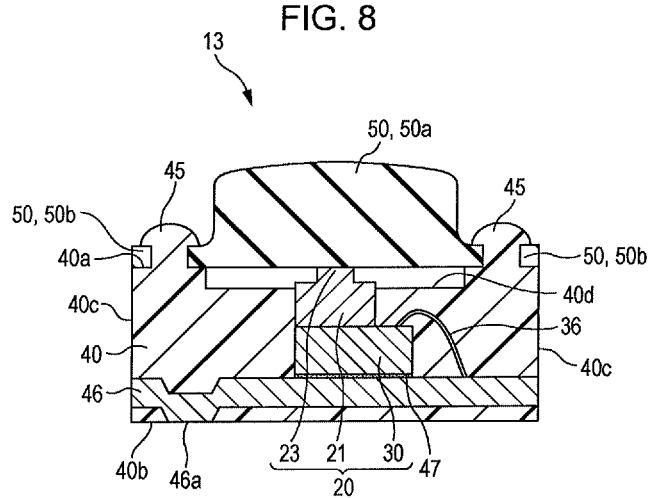
FIG. 8 is a cross-sectional view of a load detector in a third variation of the first embodiment.

FIG. 8 is a cross-sectional view of a load detector in a third variation. The load detector 13 in the third variation differs in that the plate 52 is not provided and the thick part 50a of the elastic body 50 directly abuts the pressure receiving part 23. Since, in this variation, the plate 52 is not provided, more profile reduction is possible. In addition, since the elastic body 50 directly abuts the pressure receiving part 23 of the load sensor 20, even if a strong impact is applied, the impact is reliably absorbed by the elastic body 50. This prevents an excessive load from being applied to the load sensor 20. Therefore, superior and stable sensor sensitivity can be obtained.

Second Embodiment

Figure 9:
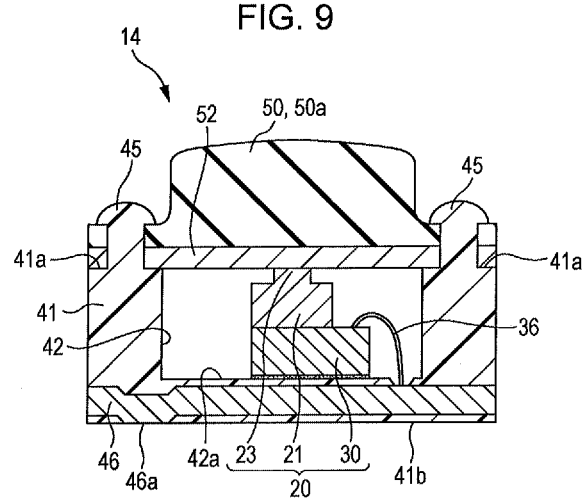
FIG. 9 is a cross-sectional view of a load detector in a second embodiment.

FIG. 9 is a cross-sectional view of a load detector in a second embodiment. As illustrated in FIG. 9, the load detector 14 in this embodiment differs in the structure of a case 41. In this embodiment, a cavity 42 may be provided in the case 41, and the load sensor 20 may be bonded to the bottom surface 42a of the cavity 42.

As illustrated in FIG. 9, part of each lead frame 46 may be exposed from the bottom surface 42a of the cavity 42, and the exposed lead frame 46 and load sensor 20 may be mutually connected electrically through the bonding wire 36. In this embodiment as well, part of the lead frame 46 is exposed from the lower surface 41b of the case 41 and is used as the mounting electrode 46a when the load detector 14 is mounted on an external substrate (not illustrated).

Since, in the load detector 14 in this embodiment as well, the load sensor 20 is placed in the case 41, the load sensor 20 is not directly touched during the handling of the load detector 14, so the ease of handling of the load detector 14 is superior. Since a load is transferred from the elastic body 50, which is placed on the same side as the upper surface of the load sensor 20, to the load sensor 20, there is no need to provide a manipulating body or another member on the elastic body 50, unlike the conventional example. This reduces the number of parts and can thereby reduce the size of the load detector 14. In addition, since the elastic body 50 directly or indirectly abuts the pressure receiving part 23 at the top of the load sensor 20, even if a strong impact is applied, the impact is absorbed by the elastic body 50 to a certain extent. This prevents an excessive load from being applied to the load sensor 20. Therefore, superior and stable sensor sensitivity can be obtained.

In the manufacturing process of the load detector 14, the case 41 is first molded integrally with the lead frames 46, after which the load sensor 20 is bonded to the bottom surface 42a of the cavity 42 and is electrically connected to the lead frames 46 with the bonding wires 36. Then, the elastic body 50 and plate 52 are attached to the upper surface 41a of the case 41. In this way, after having been resin-molded, the case 41 is connected to the lead frames 46 with the bonding wires 36, it is possible to suppress the places at which the load sensor 20 is connected to the lead frames 46 from being directly touched and improve ease of handling.

Third Embodiment

Figure 10:
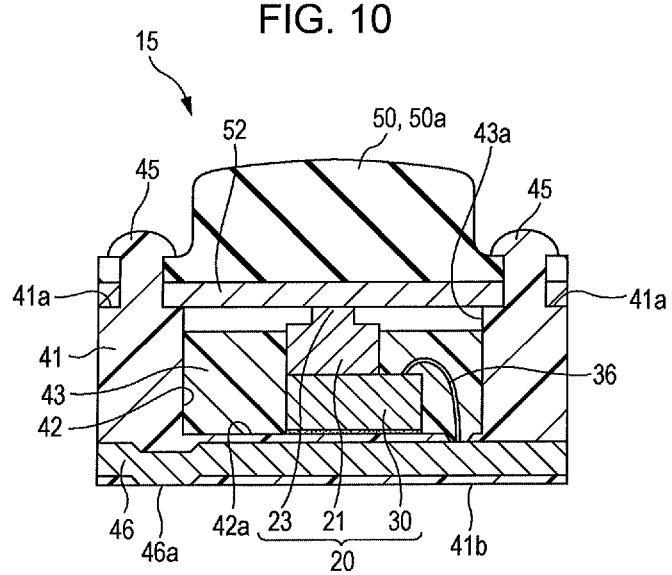
FIG. 10 is a cross-sectional view of a load detector in a third embodiment.

FIG. 10 is a cross-sectional view of a load detector in a third embodiment. In the load detector 15 in this embodiment, a sealing resin 43 is provided in the cavity 42 in the case 41. The periphery of the load sensor 20 may be sealed with the sealing resin 43. The case 41 may be molded with a thermoplastic resin (first resin). A thermoplastic resin or gelled potting resin may be used as the sealing resin 43 (second resin).

Since the convex part 45 needs to be deformed by thermal caulking or another method, PPS, PC, or another thermoplastic resin is used as the first resin used to mold the case 41. When a thermoplastic resin is used as the sealing resin 43, however, the resin contracts during a cooling process in resin molding, so a clearance may be formed between the load sensor 20 and the sealing resin 43.

In this embodiment, a thermoplastic resin may be used as the first resin, which forms the case 41 and the periphery of the load sensor 20 may be sealed with the second resin, which is a thermoplastic resin or gelled potting resin. An epoxy-based resin and silicone-based resin, for example, can be used as the thermoplastic resin. A fluorine-based resin, fluorosilicone-based resin, and the like can be used as the gelled potting resin.

When a thermoplastic resin is used, the semiconductor silicon substrate, which forms the sensor substrate 21 and the like, and the thermoplastic resin are chemically bonded together, so a clearance is hard to form between the sealing resin 43 and the load sensor 20. Accordingly, the load sensor 20 can be reliably sealed. When a gelled potting resin is used, the resin is not completely cured, so a clearance due to contraction is not formed. Accordingly, the load sensor 20 can be reliably sealed.

Therefore, according to the load detector 15 in this embodiment, it is possible to obtain superior sensor sensitivity and improve environmental resistance by reliably sealing the periphery of the load sensor 20 with the sealing resin 43.

As illustrated in FIG. 10, a concave part 43a may be formed in the upper surface of the sealing resin 43 (second resin) and the pressure receiving part 23 of the load sensor 20 may project from the bottom surface of the concave part 43a and may be exposed from the case 41. In this structure, even if a thermoplastic resin is used as the sealing resin 43 (second resin), when a load is applied, the pressure receiving part 23 can be displaced without being restricted by the sealing resin 43 (second resin), so superior sensor sensitivity can be obtained. Since the concave part 43a is formed to expose the pressure receiving part 23, the profile of the load detector 15 can be reduced.

Fourth Embodiment

Figure 11:
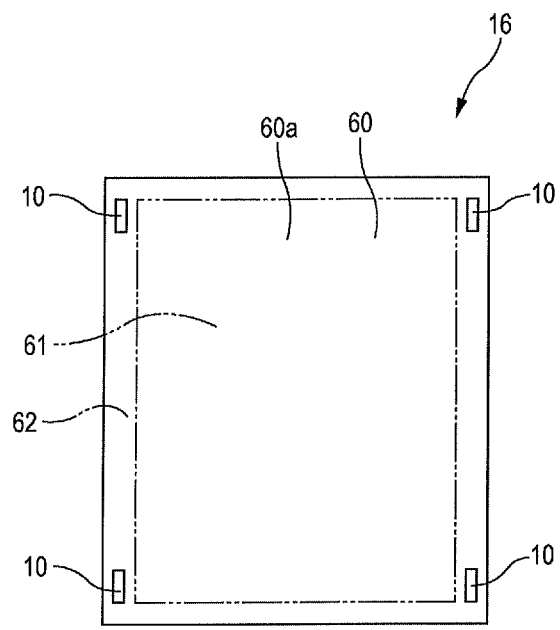
FIG. 11 is a plan view of an electronic unit in a fourth embodiment of the present disclosure.

FIG. 11 is a plan view of an electronic unit in the embodiment illustrated in FIG. 4. The electronic unit 16 in the fourth embodiment includes load detectors 10 indicated in the first embodiment and the surface panel 60. The electronic unit 16 sometimes includes a display unit (not illustrated) and the like. The electronic unit 16 in this embodiment is, for example, a mobile unit such as a smart phone, a mobile telephone or a game machine, a car navigation device, or a personal computer.

As illustrated in FIG. 11, an input area 61 is allocated at the center of the surface panel 60 and a peripheral area 62 is allocated around the input area 61. Load detectors 10 are disposed below the lower surface 60a of the surface panel 60. Although, in this embodiment, the load detectors 10 are placed at the four corners of the peripheral area 62, there is no limitation on the number of load detectors 10 and positions at which they are disposed. The cross-sectional shapes of each load detector 10 and the surface panel 60 are as illustrated in FIGS. 5A and 5B.

When the manipulator presses the input area 61 of the surface panel 60, the load sensor 20 in the load detector 10 receives a load. Then, an output from each load detector 10 is obtained. According to each output, information about the pressing such as the pressing force (load) and the amount of displacement of the surface panel 60 in its height direction can be detected. To detect the pressing information from each output, an existing method can be used.

Since compact load detectors 10 are built into the electronic unit 16 in this embodiment, the size and profile of the electronic unit 16 can be reduced. Since the load detector 10 used in this embodiment can efficiently transfer a load to the load sensor 20 and, even if a strong impact is applied, an excessive load is not applied to the load sensor 20, superior and stable sensor sensitivity can be obtained. Therefore, load detectors 10 of this type are built into the electronic unit 16, sensor sensitivity that are superior and stable as the sensor sensitivity of the electronic unit 16 can be obtained.

What is claimed is:
1. A load detector comprising:
a load sensor having a projective pressure receiving part;
a case in which the load sensor is placed with the pressure receiving part facing toward an upper surface of the case wherein a convex part is on the upper surface of the case;
an elastic body placed on the same side as an upper surface of the load sensor, the elastic body configured to receive a load and press the load sensor in a height direction of the load sensor wherein: an upper surface of the elastic body projects beyond the convex part and the convex part is a stopper that restricts a displacement of the elastic body when a load is applied to the elastic body; the elastic body has a thick part at a position at which the thick part faces the load sensor in a height direction of the load sensor and has a peripheral part around the thick part; the peripheral part is thinner than the thick part; an upper surface of the thick part projects beyond the convex part; and the convex part passes through the peripheral part and secures the elastic body and case together; and
a plate provided between the elastic body and the load sensor, the plate being more rigid than the elastic body wherein the plate lies in an overlapping manner under the peripheral part.
2. The load detector according to claim 1, further comprising a lead frame that extends from an interior of the case toward an outside of the case, wherein:
the load sensor is electrically connected to the lead frame, and
the lead frame is exposed to the outside of the case.

3. The load detector according to claim 2, wherein the load sensor is bonded to the lead frame.

4. The load detector according to claim 2, wherein:
the case is made of a first resin; and
the case and lead frame are molded integrally.

5. The load detector according to claim 4, wherein:
the case has a cavity in which the load sensor is placed;
the lead frame is disposed so as to be exposed from a bottom surface of the cavity; and
the exposed lead frame and the load sensor are mutually connected.

6. The load detector according to claim 4, wherein:
at least the pressure receiving part of the load sensor is exposed; and
a periphery of the load sensor is sealed with the first resin.

7. The load detector according to claim 6, wherein:
a concave part is formed in the upper surface of the case; and
the pressure receiving part of the load sensor projects from a bottom surface of the concave part and is exposed from the case.

8. The load detector according to claim 4, wherein:
the first resin is a thermoplastic resin;
at least the pressure receiving part of the load sensor is exposed; and
the periphery of the load sensor is sealed with a second resin, the second resin being a thermoplastic resin or a gelled potting resin.

9. The load detector according to claim 8, wherein:
a concave part is formed in an upper surface of the second resin, the second resin sealing the load sensor; and
the pressure receiving part of the load sensor projects from a bottom surface of the concave part and is exposed from the second resin.

10. An electronic unit comprising:
a load detector comprising:
a load sensor having a projective pressure receiving part;
a case in which the load sensor is placed with the pressure receiving part facing toward an upper surface of the case wherein a convex part is on the upper surface of the case;
an elastic body placed on the same side as an upper surface of the load sensor, the elastic body configured to receive a load and press the load sensor in a height direction of the load sensor wherein: an upper surface of the elastic body protects beyond the convex part and the convex part is a stopper that restricts a displacement of the elastic body when a load is applied to the elastic body; the elastic body has a thick part at a position at which the thick part faces the load sensor in a height direction of the load sensor and has a peripheral part around the thick part; the peripheral part is thinner than the thick part; an upper surface of the thick part protects beyond the convex part; and the convex part passes through the peripheral part and secures the elastic body and case together;
a plate provided between the elastic body and the load sensor, the plate being more rigid than the elastic body wherein the plate lies in an overlapping manner under the peripheral part; and
a surface panel having a manipulation surface; wherein
the surface panel is placed so as to be displaceable in a height direction of the load detector on the same side as an upper surface of the load detector, and
when the manipulation surface is pressed, the load sensor detects information about a pressing of the manipulation surface by receiving a load through the elastic body.

* * * * *

UNITED STATES PATENT AND TRADEMARK OFFICE
CERTIFICATE OF CORRECTION

PATENT NO. : 9,664,576 B2  
APPLICATION NO. : 14/610445  
DATED : May 30, 2017  
INVENTOR(S) : Takashi Sato et al.

Page 1 of 1

It is certified that error appears in the above-identified patent and that said Letters Patent is hereby corrected as shown below:

In the Claims

In Column 12, Claim 10, Line 11, after "of the elastic body" replace "protects" with --projects--.

In Column 12, Claim 10, Line 19, after "of the thick part" replace "protects" with --projects--.

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*